(12) United States Patent
Michael et al.

(10) Patent No.: US 9,752,291 B2
(45) Date of Patent: Sep. 5, 2017

(54) UPRIGHT PROTECTOR

(71) Applicant: Ridg-U-Rak, Inc., North East, PA (US)

(72) Inventors: Robert J. Michael, Waterford, PA (US); James A. Courtwright, North East, PA (US)

(73) Assignee: Ridg-U-Rak, Inc., North East, PA (US)

( * ) Notice: Subject to any disclaimer, the term of this patent is extended or adjusted under 35 U.S.C. 154(b) by 330 days.

(21) Appl. No.: 14/157,121

(22) Filed: Jan. 16, 2014

(65) Prior Publication Data

US 2014/0196997 A1 Jul. 17, 2014

Related U.S. Application Data

(60) Provisional application No. 61/753,114, filed on Jan. 16, 2013.

(51) Int. Cl.
*F16F 7/12* (2006.01)
*E01F 15/14* (2006.01)
*F16F 9/00* (2006.01)

(52) U.S. Cl.
CPC ........ *E01F 15/141* (2013.01); *B65G 2207/40* (2013.01)

(58) Field of Classification Search
CPC ... F16F 1/36; F16F 3/08; E04F 19/026; E04F 15/141; A47B 95/043; B65G 2207/40
USPC ................................................. 188/371, 377
See application file for complete search history.

(56) References Cited

U.S. PATENT DOCUMENTS

| 179,690 | A | * | 7/1876 | Evans .................. A47B 95/043 |
| | | | | 248/345.1 |
| 1,620,933 | A | | 3/1927 | Wilcox |
| 1,679,117 | A | | 7/1928 | Dye |
| 3,303,937 | A | | 2/1967 | McConnell |
| 3,372,552 | A | | 3/1968 | Liddell |
| 3,472,489 | A | | 10/1969 | Baylin |
| 3,559,356 | A | | 2/1971 | Koral |
| 3,626,487 | A | | 12/1971 | Seiz |
| 3,681,885 | A | | 8/1972 | Goggins |

(Continued)

FOREIGN PATENT DOCUMENTS

| GB | 2334736 A | 9/1999 |
| GB | 2374375 A | 10/2002 |

(Continued)

*Primary Examiner* — Melody Burch
(74) *Attorney, Agent, or Firm* — Jonathan M. D'Silva; MMI Intellectual Property

(57) ABSTRACT

A protector allows for the engagement and protection of a segment of an upright from an impact force by an external object and for absorbing and damping the resulting impact force. The protector comprises a protector body and a shim. The protector body allows engagement and positioning of the protector on at least a segment of the upright. The protector body is also partially constructed of an energy absorbing and damping material and having an outer surface and an inner surface. The outer surface is positionable to receive the impact force from the external object. The inner surface is positionable to abut the upright, when the protector is in engagement with the upright. The shim is least partially embedded in the protector body and provides increased structural support for the protector body. The shim also has a stiffness different than the stiffness of the protector body.

88 Claims, 15 Drawing Sheets

(56) References Cited

U.S. PATENT DOCUMENTS

| | | | |
|---|---|---|---|
| 3,712,003 | A | 1/1973 | Hallock et al. |
| 3,717,968 | A | 2/1973 | Olsen et al. |
| 4,012,878 | A | 3/1977 | Ellingson |
| 4,555,870 | A | 12/1985 | McKinnon et al. |
| 4,585,131 | A | 4/1986 | Crossman et al. |
| 4,703,531 | A * | 11/1987 | Bissett ............... A47C 27/085 248/118 |
| 4,768,320 | A | 9/1988 | Weller |
| 4,898,285 | A | 2/1990 | Field |
| 4,946,727 | A | 8/1990 | Kessler |
| 5,096,753 | A | 3/1992 | McCue et al. |
| 5,186,455 | A * | 2/1993 | Rosetta ............... A63B 57/10 473/131 |
| 5,203,130 | A | 4/1993 | Freelove |
| 5,369,925 | A | 12/1994 | Vargo |
| 5,411,234 | A | 5/1995 | Schoeller |
| 5,603,140 | A | 2/1997 | Pryce |
| 5,622,356 | A | 4/1997 | Duggan |
| 5,737,878 | A | 4/1998 | Raulerson et al. |
| 5,836,134 | A | 11/1998 | Couto et al. |
| 5,897,286 | A | 4/1999 | Whittaker |
| 5,931,434 | A | 8/1999 | Rodriguez |
| 5,934,623 | A | 8/1999 | Kopish |
| 6,102,611 | A | 8/2000 | Roller |
| 6,244,781 | B1 | 6/2001 | Roller |
| 6,332,549 | B1 | 12/2001 | MacDonald |
| 6,357,187 | B1 | 3/2002 | Haldeman |
| 6,374,555 | B1 | 4/2002 | Gusler |
| 6,494,640 | B2 | 12/2002 | Roller |
| 6,526,708 | B1 | 3/2003 | Hartley et al. |
| 6,609,620 | B1 | 8/2003 | Kautz et al. |
| D482,128 | S | 11/2003 | Krueger et al. |
| 6,826,877 | B1 | 12/2004 | Stradel |
| 6,920,990 | B2 | 7/2005 | Krueger et al. |
| 7,007,815 | B2 | 3/2006 | Anderson et al. |
| 7,070,021 | B1 | 7/2006 | McKinney |
| 7,090,428 | B2 | 8/2006 | Hinojosa |
| 7,104,514 | B2 | 9/2006 | Ciarlo |
| 7,182,993 | B1 * | 2/2007 | Hamilton ............ A47B 95/043 108/27 |
| 7,261,374 | B2 | 8/2007 | Potosky |
| 7,353,640 | B2 | 4/2008 | Stutler |
| 7,490,806 | B2 | 2/2009 | Rioux |
| 7,753,326 | B2 | 7/2010 | Wentworth |
| 7,950,706 | B2 | 5/2011 | Shaw et al. |
| D649,094 | S | 11/2011 | Cordes |
| 8,182,895 | B2 | 5/2012 | Myler |
| 8,267,262 | B2 * | 9/2012 | Thelwell ............ A47B 95/043 211/183 |
| 2004/0088933 | A1 | 5/2004 | Mayes |
| 2004/0094496 | A1 | 5/2004 | MacDonald |
| 2004/0169120 | A1 | 9/2004 | Brown |
| 2008/0029676 | A1 * | 2/2008 | Huxtable ............ A47B 95/043 248/345.1 |
| 2008/0149581 | A1 | 6/2008 | Clarke et al. |
| 2010/0300028 | A1 | 12/2010 | Huxtable |
| 2011/0284710 | A1 | 11/2011 | Wallace et al. |

FOREIGN PATENT DOCUMENTS

| | | |
|---|---|---|
| GB | 2407275 A | 4/2005 |
| WO | 2005049949 A1 | 6/2005 |
| WO | 2005075745 A1 | 8/2005 |
| WO | 2009007467 A8 | 1/2009 |

* cited by examiner

UPRIGHT PROTECTOR

BACKGROUND

Uprights, sometimes called "structures" or "columns," are found on rack systems for storing goods in locations having confined spaces, scaffolding systems surrounding buildings, pipes within plumbing systems, and lumber, etc. Frequently these uprights take on strong impact forces due to various kinds of machinery or other heavy loads accidentally bumping into them, as can be typical in a warehouse or industrial environment. Such impacts can over time lead to permanent wear or otherwise be detrimental to the upright. Thus, it would be desirable to have an apparatus designed to diminish energy of such impact forces.

SUMMARY

A protector of the invention allows for the engagement and protection for a segment of an upright from an impact force by an external object and for absorbing and damping the resulting impact force while traveling through the protector. The protector comprises a protector body and a shim. The protector body allows engagement and positioning of the protector on at least a segment of the upright. The protector body is also at least partially constructed of an energy absorbing and damping material and comprises an outer surface and an inner surface. The outer surface is positionable to receive the impact force from the external object, when positioned on the upright. The inner surface of the protector body is positionable to abut the upright, when the protector is in engagement with the upright. The shim is at least partially embedded in the protector body and provides increased structural support for the protector body. The shim has a stiffness that is different than the stiffness of the protector body.

The protector can comprise a column spacer molded into the inner surface of the protector body. The column spacer can be in a position such that it does not pass beyond the shim to the outer surface of the protector body and can comprise a waffle-shaped pattern. The column spacer can be made to partially buckle after the outer surface has received the impact force. In other instances, the protector can comprise a plurality of column spacers molded into the inner surface of the protector body. Each of the plurality of column spacers can be made to partially buckle after the outer surface has received the impact force.

The protector can also comprise a plurality of tabs joined to the protector body. The plurality of tabs assists the protector in engagement with the upright. The protector can also comprise a second shim that is partially embedded in the protector body, a high-visibility plate that is releasably joinable to the outer surface of the protector body, or both. The protector can comprise a joining mechanism used for permanently mounting the protector to the upright.

The energy absorbing and damping material can also be at least partially elastomeric material and the protector body can have a continuous volume of the energy absorbing and damping material between the inner surface and the outer surface. However, in some embodiments the protector body can also comprise an internal core for causing spring-like damping within the protector body, if the protector body doesn't have a continuous volume of the energy absorbing and damping material. In some contemplated embodiments, the internal core can even be filled with damping material. The protector body can also be partially fabricated through an injection molding process or extrusion process. The outer surface of the protector body can comprise a plurality of contours. The inner surface of the protector body can comprise a series of mounting devices that are used for assisting the protector in engaging with the upright. The inner surface of the protector body can also create an opening that enables the protector to engage with a non-traditional upright.

The stiffness of the shim can be greater than the stiffness of the protector body. The shim can also be constructed of rigid material, which includes, but is not limited to metallic material or plastic material. The shim can comprise an upset that at least partially secures the shim within the protector body. The shim can also be approximately equidistant from the outer surface of the protector body. The shim can also be approximately equidistant from the inner surface of the protector body. The damping of the impact force in the protector body can be caused by friction between the shim and the protector body or through hysteresis, or both. The shim can also partially deflect the impact force from reaching the inner surface of the protector body.

The invention further contemplates a protector for engaging and protecting a segment of an upright from an impact force by an external object and for absorbing and damping the resulting impact force while it is traveling through the protector. The protector cam comprise a protector body, a shim, and a column spacer. The protector body can allow engagement and positioning of the protector on at least a segment of the upright. The protector body is also at least partially constructed of an energy absorbing and damping material and comprises an outer surface and an inner surface. The outer surface is normally positionable to receive the impact force from the external object, when positioned on the upright. The inner surface of the protector body is positionable to abut the upright, when the protector is in engagement with the upright. The shim is at least partially embedded in the protector body and provides increased structural support for the protector body. The shim has a stiffness that is different than the stiffness of the protector body. The column spacer is molded into the inner surface of the protector body and partially buckles after the outer surface has received the impact force.

The protector can also comprise a plurality of tabs joined to the protector body. The plurality of tabs assists the protector in engagement with the upright. The protector can also comprise a second shim that is partially embedded in the protector body, a high-visibility plate that is releasably joinable to the outer surface of the protector body, or both. The protector can comprise a joining mechanism used for permanently mounting the protector to the upright.

In some embodiments, the column spacer does not pass beyond the shim to the outer surface of the protector body. The column spacer can also comprise a waffle-shaped pattern. The energy absorbing and damping material can also be at least partially elastomeric material and the protector body can have a continuous volume of the energy absorbing and damping material between the inner surface and the outer surface. However, the protector body can also comprise an internal core for causing spring-like damping within the protector body, if the protector body doesn't have a continuous volume of the energy absorbing and damping material. In some contemplated embodiments, the internal core can even be filled with damping material. It is contemplated the protector body can also be partially fabricated through an injection molding process or extrusion process. In some embodiments, the outer surface of the protector body can comprise a plurality of contours. The inner surface of the protector body can comprise a series of mounting devices that are used for assisting the protector in engaging with the upright. The inner surface of the protector body can also create an opening that enables the protector to engage with a non-traditional upright.

In some embodiments, the stiffness of the shim can be greater than the stiffness of the protector body. The shim can also be constructed of rigid material, which includes, but is not limited to metallic material or plastic material. The shim can comprise an upset that at least partially secures the shim within the protector body. The shim can also be approximately equidistant from the outer surface of the protector body. The shim can also be approximately equidistant from the inner surface of the protector body. The damping of the impact force in the protector body can be caused by friction between the shim and the protector body or through hysteresis, or both. The shim can also partially deflect the impact force from reaching the inner surface of the protector body.

The invention further contemplates a protector for engaging and protecting a segment of an upright from an impact force by an external object and for absorbing and damping the resulting impact force while it is traveling through the protector. The protector can comprise a protector body and a shim. The protector body can also allow engagement and positioning of the protector on at least a segment of the upright. The protector body can also at least partially constructed of an energy absorbing and damping material, substantially and resiliently deforms when receiving the impact force from the external object, the protector body an outer surface and an inner surface. The outer surface can be positionable to receive the impact force from the external object, when positioned on the upright. The inner surface of the protector body can be positionable to abut the upright, when the protector is in engagement with the upright. The shim can be at least partially embedded in the protector body to provide increased structural support for the protector body. The shim can be positioned to at least partially deflect the impact force while traveling through the protector body. The shim can also be made of a rigid material and can have a stiffness that is different than the stiffness of the protector body.

The protector can comprise a column spacer molded into the inner surface of the protector body. The column spacer can be positioned so that it does not pass beyond the shim to the outer surface of the protector body and comprises a waffle-shaped pattern. The column spacer can be made to partially buckle after the outer surface has received the impact force. In some contemplated embodiments, the protector can comprise a plurality of column spacers molded into the inner surface of the protector body. Each of the plurality of column spacers can be made to partially buckle after the outer surface has received the impact force.

The protector can also comprise a plurality of tabs joined to the protector body. In such contemplated embodiments, the plurality of tabs assists the protector in engagement with the upright. The protector can comprise a second shim that is partially embedded in the protector body, a high-visibility plate that is releasably joinable to the outer surface of the protector body, or both. The protector can comprise a joining mechanism used for permanently mounting the protector to the upright.

The energy absorbing and damping material can also be at least partially elastomeric material and the protector body can have a continuous volume of the energy absorbing and damping material between the inner surface and the outer surface. However, the protector body can also comprise an internal core for causing spring-like damping within the protector body, if the protector body doesn't have a continuous volume of the energy absorbing and damping material. The internal core can also be filled with damping material. The protector body can also be partially fabricated through an injection molding process or extrusion process. The outer surface of the protector body can comprise a plurality of contours. The inner surface of the protector body can comprise a series of mounting devices that are used for assisting the protector in engaging with the upright. The inner surface of the protector body can also create an opening that enables the protector to engage with a non-traditional upright.

In some embodiments, the stiffness of the shim is greater than the stiffness of the protector body. The shim can be constructed of metallic material or plastic material. In some embodiments, the shim is approximately equidistant from the outer surface of the protector body. In other instances, the shim is equidistant from the inner surface of the protector body. The shim can comprise an upset that at least partially secures the shim within the protector body. The damping of the impact force in the protector body can be caused by friction between the shim and the protector body or through hysteresis, or both.

The invention also contemplates a protector for engaging and protecting a segment of an upright from an impact force by an external object and for absorbing and damping the resulting impact force while it is traveling through the protector. The protector can comprise a protector body, a shim, a column spacer, and a plurality of tabs. The protector body can allow engagement and positioning of the protector on at least a segment of the upright. In such embodiments, the protector body can also at least partially constructed of an energy absorbing and damping elastomeric material, substantially and resiliently deforms when receiving the impact force from the external object, and comprises an outer surface and an inner surface. The outer surface can be positionable to receive the impact force from the external object, when positioned on the upright. The inner surface of the protector body would then be positionable to abut the upright, when the protector is in engagement with the upright. It is contemplated the inner surface can also create an opening with a substantially square-shaped cross section and plurality of corners.

The shim is at least partially embedded in the protector body to provide increased structural support for the protector body. The shim can at least partially deflect the impact force while it travels through the protector body as well as transfers the remaining impact force to each the corners of the opening. The shim is approximately equidistant from the inner surface of the protector body. The shim can also be made of a rigid material and have a stiffness that is greater than the stiffness of the protector body.

The column spacer can be molded into the inner surface of the protector body. The column spacer can be detached from the shim and not pass beyond it to the outer surface of the protector body. The column spacer can also comprise a waffle-shaped pattern and be made to partially buckle after the outer surface has received the impact force. The plurality of tabs that are each joined to the protector body and assists the protector in engagement with the upright.

It is contemplated the protector can also comprise a second shim that is partially embedded in the protector body, a high-visibility plate that is releasably joinable to the outer surface of the protector body, or both. The protector can comprise a joining mechanism used for permanently mounting the protector to the upright.

The protector body can have a continuous volume of the energy absorbing and damping material between the inner surface and the outer surface. However, the protector body can also comprise an internal core for causing spring-like damping within the protector body, if the protector body doesn't have a continuous volume of the energy absorbing and damping material. In some embodiments, the internal core can even be filled with damping material. The protector body can also be partially fabricated through an injection molding process or extrusion process. The outer surface of the protector body can comprise a plurality of contours. It is contemplated the inner surface of the protector body can comprise a series of mounting devices that are used for assisting the protector in engaging with the upright.

The shim can be constructed of metallic material or plastic material. The shim can comprise an upset that at least partially secures the shim within the protector body. The damping of the impact force in the protector body can be caused by friction between the shim and the protector body or through hysteresis, or both.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
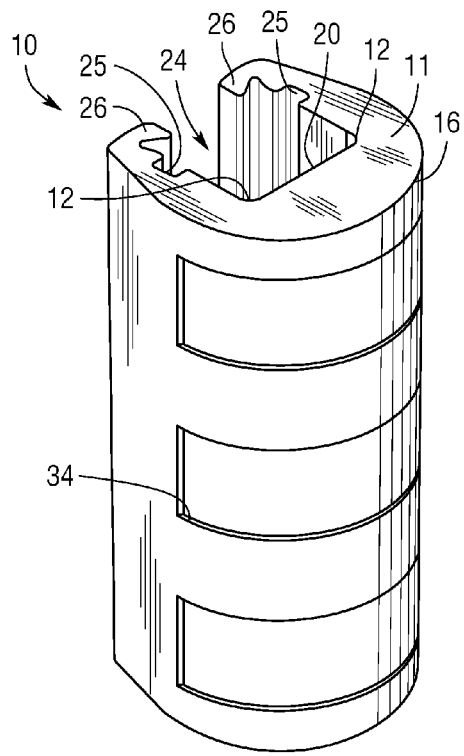
FIG. 1 shows a perspective view of a protector.
Figure 3:
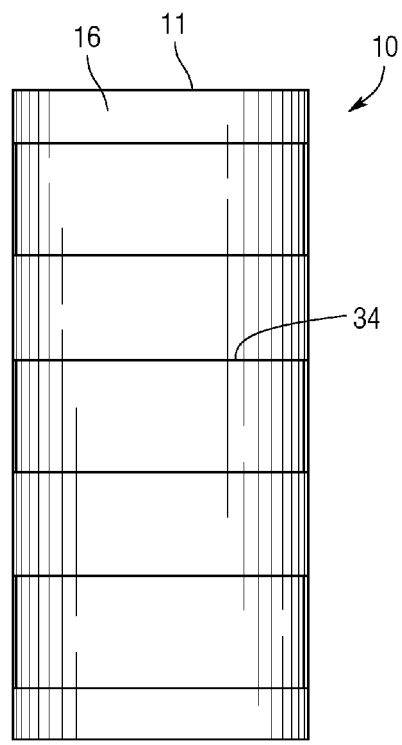
FIG. 3 shows a side view of the protector of FIG. 1.
Figure 2:
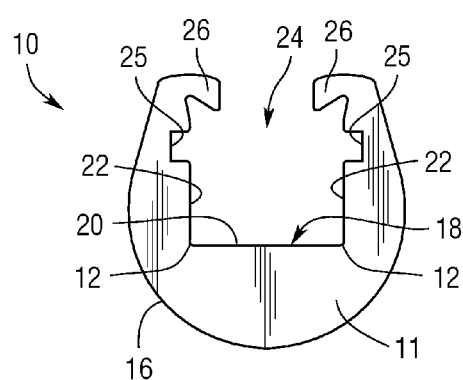
FIG. 2 shows a top view of the protector of FIG. 1.
Figure 4:
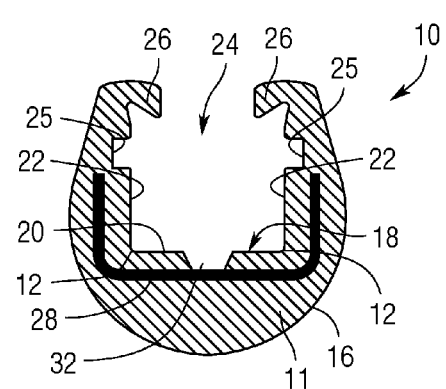
FIG. 4 shows a cross sectional view of the protector of FIG. 1.
Figure 5:
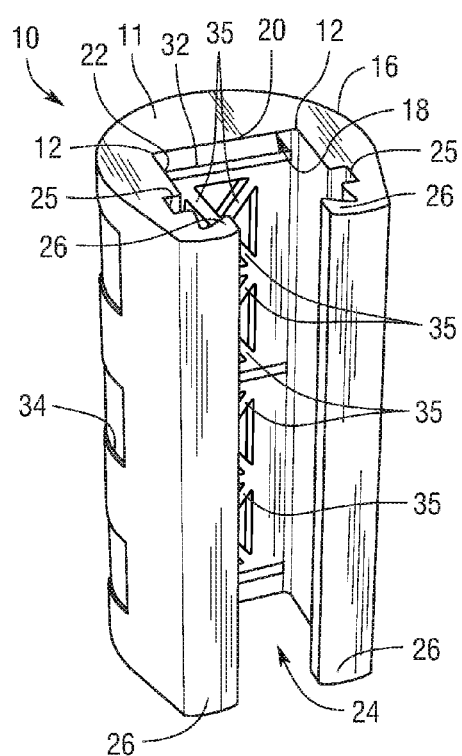
FIG. 5 shows a rear-perspective view of the protector of FIG. 1.
Figure 6:
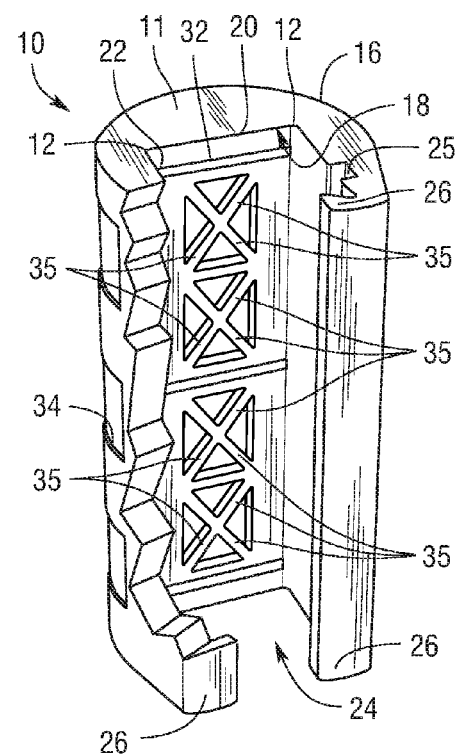
FIG. 6 shows a rear-perspective view of the protector of FIG. 1, exposing the back wall of the protector.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

FIGS. 1 through 6 depict a protector 10 for engaging and protecting a segment of the upright from an impact force by an external object. The protector 10 is used for absorbing energy and dissipating additional energy through damping to significantly reduce the resulting impact force while the force travels through the protector 10. After initial impact, the protector will absorb the energy and the damping effects will dissipate the energy from the impact force such that at least partially, if not all of, this energy diminishes before reaching the upright.

The protector 10 has a protector body 11 that allows engagement and positioning of the protector 10 on the segment of the upright. The protector body 11 is at least partially constructed from some type of energy absorbing and damping material, which is substantially and resiliently deformable upon receiving an impact from an external object (not shown). In this embodiment, elastomeric material is used to construct the protector body 11 because elastomeric material has an elastic component for absorbing shock (or isolating vibration), which in effect causes substantial and resilient deformation of the protector body 11 and allows the protector 10 to store and release potential energy. Elastomeric material also has a hysteretic damping component for dissipating energy.

The protector body 11 is also typically fabricated through an injection molding process. However, it will be understood that the protector body 11 does not necessarily need to be constructed from elastomeric material, so long as the protector body 11 has a sufficient energy absorbing component and damping component. It will also be understood that the protector body 11 can be fabricated using several anticipated manufacturing methods, such as an extrusion process or molding process.

Figure 7:
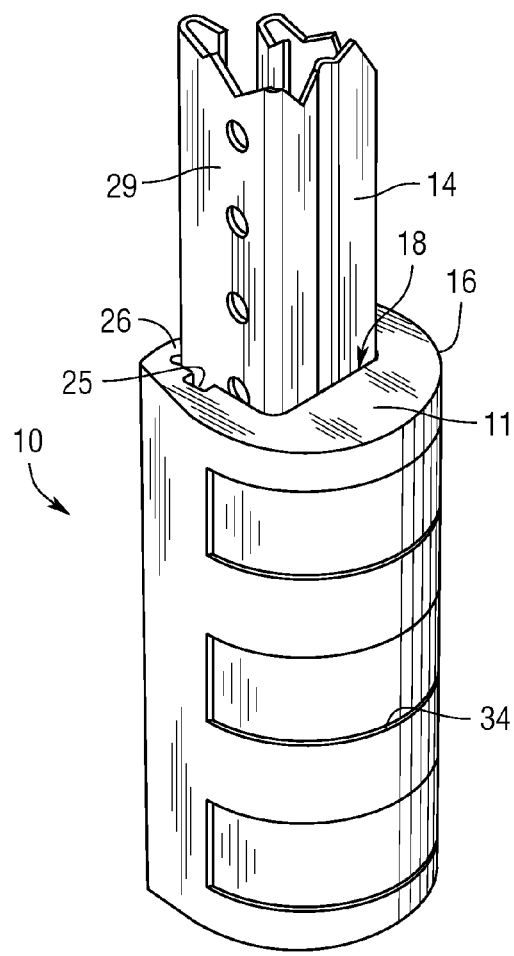
FIG. 7 shows a perspective view of the protector of FIG. 1, as engaged with an upright.
Figure 8:
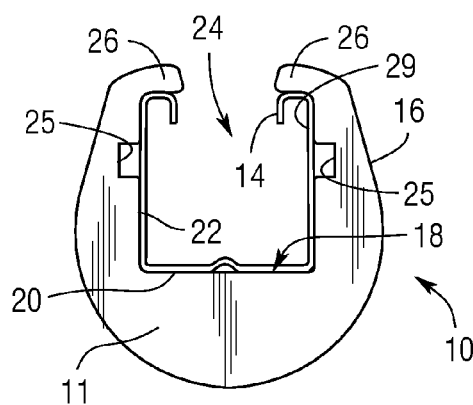
FIG. 8 shows a top view of FIG. 7.

The protector 10 is designed to protect a segment of the upright 14 from both frontal and side impact forces from an external object (not shown). As shown in FIGS. 7 and 8, the upright 14 is vertical. However, it will be understood that the protector 10 may protect uprights that are positioned to be substantially horizontal, diagonal, or otherwise oriented.

Referring back to FIGS. 1 through 6, the protector body 11 has an outer surface 16 and an inner surface 18 with a continuous volume of elastomeric material between both surfaces and a shim 28 embedded within it, discussed in detail below. The outer surface 16 is intended to be positionable to receive the impact force from the external object, when positioned on the upright 14. The inner surface 18 is intended to be positionable to abut the upright 14, when the protector 10 is in engagement with a segment of the upright 14. The inner surface 18 has a substantially square-shaped cross section, with a back wall 20 and two identical side walls 22. At the intersection of the back wall 20 and each side wall 22 is a corner 12. The design of the inner surface 18 accommodates traditional uprights comprising substantially square-shaped cross sections having sides 29 that are approximately two to three inches lengthwise. However, it should be understood that the inner surface 18 can be made to mount on non-traditional uprights 14 comprising cross sections of varying shape. Each side wall 22 comprises a shallow channel 25 running the length of the protector 10. These channels 25 facilitate the protector 10 being engaged with uprights 14 having flanges, or the like, running lengthwise along the upright 14.

Figure 9:
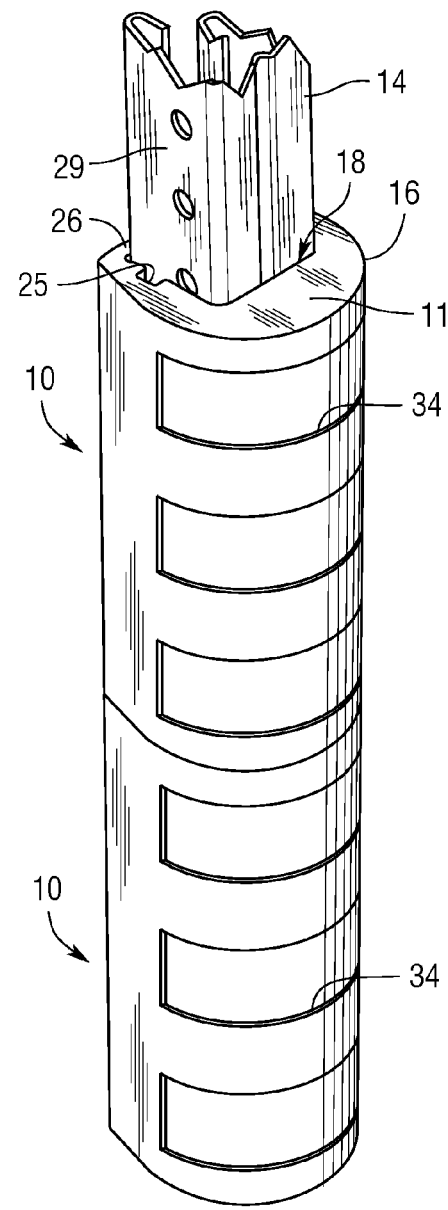
FIG. 9 shows a plurality of protectors of FIG. 1, stacked on top of each other and each engaged with an upright.
Figure 10:
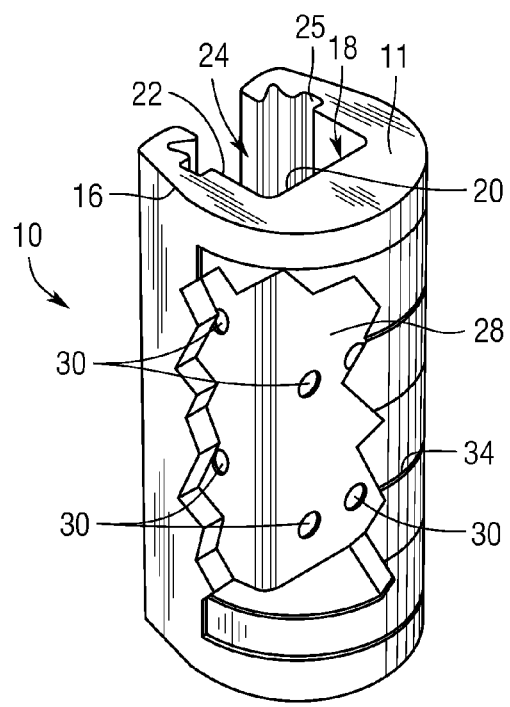
FIG. 10 shows a perspective view of the protector of FIG. 1, exposing a shim embedded within the protector.

At a position near the entrance to the opening 24, each side wall 22 also comprises a peripherally spanning tab 26, directed toward the center at the opening 24, joined to it during construction and through the molding process. As better understood with reference to FIG. 8, the tabs 26 are used to engage the back side of the upright 14 and secure engagement of the protector 10 with the upright 14. Each tab 26 is semi-flexible, enabling the protector 10 to quickly engage and disengage with the upright 14. As shown in FIG. 9, it is possible for multiple protectors 10 to engage and disengage with the upright 14 by stacking on top of each other, so long as the upright 14 has enough length.

Figure 11:
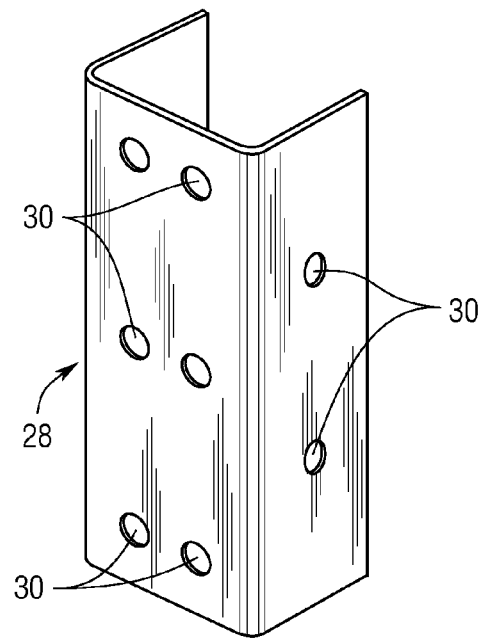
FIG. 11 shows a perspective view of the shim of FIG. 10.
Figure 12:
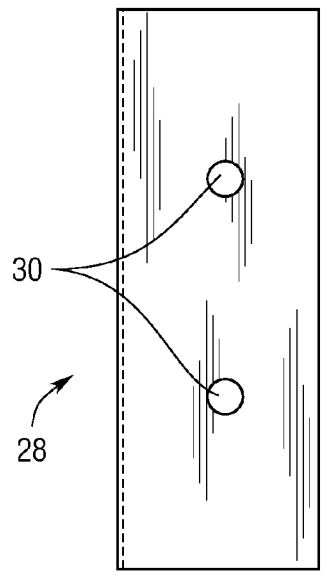
FIG. 12 shows a side view of the shim of FIG. 10.
Figure 13:
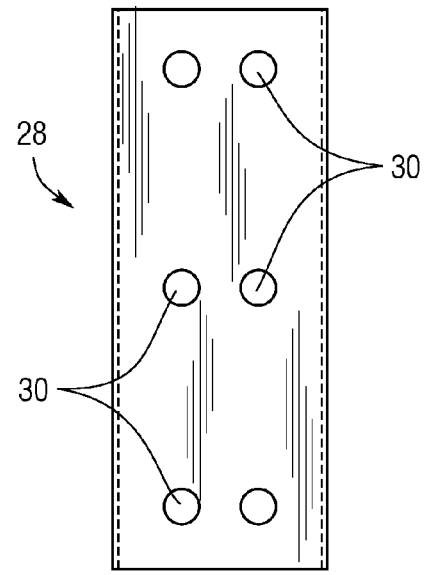
FIG. 13 shows a front view of the shim of FIG. 10.

As shown in FIGS. 11 through 13, a three-sided shim 28 is embedded within the protector 10 by being over molded into the protector 10 during construction. The shim 14 has a stiffness that is different than the stiffness of the protector body 11, so the shim 14 can provide structural support for the protector body 11. In this embodiment, the shim 28 is made of a rigid material that is substantially stiffer than the elastomeric material constructing the protector 10. Typically the shim 28 is made of a metal or hard plastic, however, it will be understood that any rigid material substantially stiffer than the elastomeric material constructing the protector 10 can also be used.

The shim 28 is embedded within the protector 10 at a position that is directly between the outer surface 16 and inner surface 18 except for the encapsulating segments of the protector body 11 both above and below the shim 28. The elastomer material molds through the shim 28 via a series of holes 30 located on all three sides, permanently securing the shim 28 in position within the protector 10. As shown, the series of holes 30 run along each of the sides of the shim 28; however, it will be understood that the pattern and number of holes 30 may vary from what is disclosed. In this embodiment, the series of holes 30 has a dual row pattern, which comprises two parallel series having three holes on the front of the shim 28 and one series having two holes on each of the sides of the shim 28. However, other hole 30 patterns, sizes, shapes, and numbers may work equally as well when implemented to securely embed the shim 28 within the protector 10 during construction. It will also be understood that the shim 28 may be bonded to the elastomer material with chemical adhesive or be left unbonded within the protector 10, so long as the shim 28 is secure when embedded within the protector 10.

Figure 14:
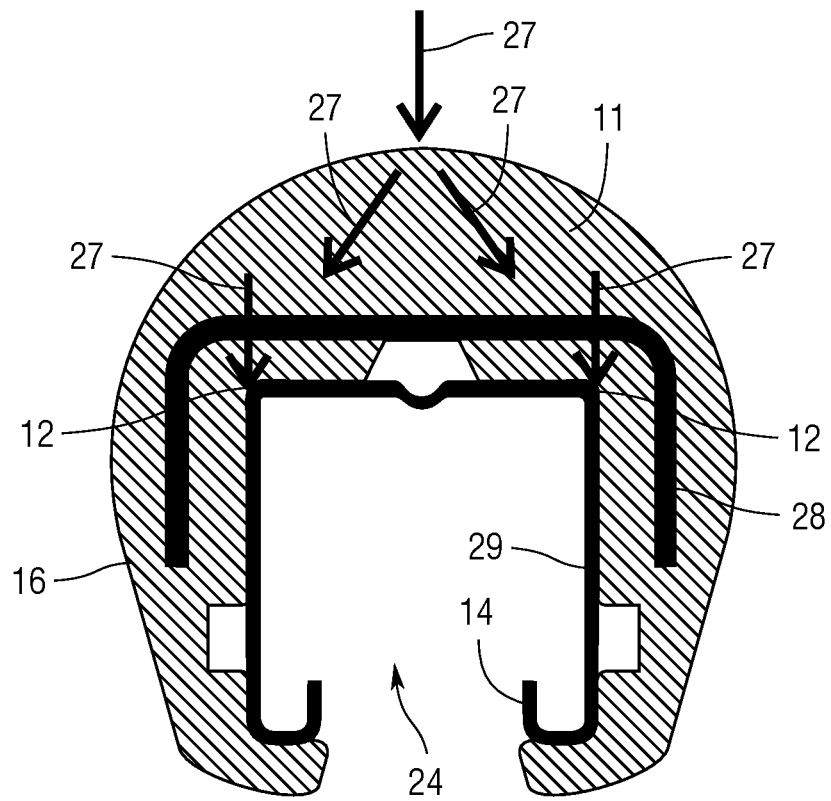
FIG. 14 shows a cross sectional view of the protector of FIG. 1, disclosing the energy of the impact force being transferred within the protector.

As can be seen in FIG. 14, after an impact has occurred, the shim 28 will also partially deflect as well as transfer any remaining energy from the impact force 27 to each corner 12 of the opening 24. Remaining non-deflected energy from the impact force 27 will also be further absorbed through damping caused by the interaction between the shim 28 and the elastomeric material constructing the protector 10, especially at the portions of the shim 28 parallel to the side walls 22. In this embodiment, the shim 28 is considered to be at least partially and approximately equidistant from the inner surface 18, causing it to have a c-channel shape that has a substantially square-shaped cross section and similar to the substantially square-shape of the inner surface 18. Being approximately equidistant from the inner surface 18 ensures protection on the sides of the upright 14 from receiving an impact. It should be understood that certain portions of the shim 28$q$ will still be considered approximately equidistant even if those portions do not completely follow the substantially-square shape of the inner surface 18$q$.

Figure 15:
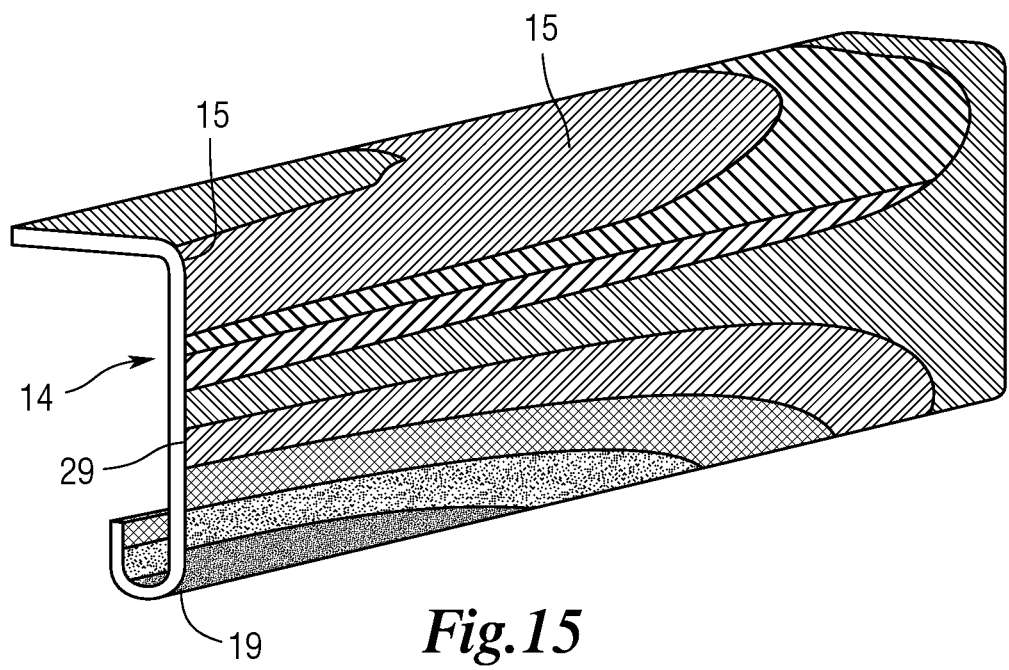
FIG. 15 shows the stresses on the upright after the protector has received an impact force.

As shown in FIG. 15, upon transferring the impact force to each corner 12, minimal amounts of energy from this impact force will pass beyond the shim 28, go through to the inner surface 18, and cause stress to the upright 14. As the energy from the impact force enters the upright 14, through an entrance area 15 on the upright 14, the impact force spreads out and to the back edges of the upright 14. Ultimately, the energy spreads into a peak-buildup location 19, where the most stress on the upright 14 occurs, and dissipates. Overall, since most energy of the impact force is absorbed while being transferred throughout the protector 10, the stress on the upright 14 is minimal when entering the upright 14 at the entrance location 15. Therefore, only a minor amount of energy enters and spreads throughout the upright 14, typically only causing the upright 14 to minimally bend and flex after an impact. It should be understood that the peak-buildup location 19 could be elsewhere when other embodiments of the protector 10 have engaged with the upright 14.

Referring back to FIGS. 4 through 6, a column spacer 32 is molded into the unitary structure of the protector 10 at both ends, substantially creating the back wall 20 of the inner surface 18. In this embodiment, the column spacer 32 is positioned between the shim 28 and the inner surface 18, but does not actually pass beyond the shim 28. In this embodiment, the column spacer 32 comprises a waffle-shaped pattern, causing the back wall 20 to have less points of contact with the upright 14 than the side walls 22, when the protector is in engagement with the upright 14. Essentially, when an impact force is received by the protector 10, the waffle-shaped pattern enables the back wall 20 to partially buckle and deform before the energy of the impact force travels into the upright 14. Partial buckling occurs when the waffle-shaped pattern of the column spacer 32 bends and gives way upon the outer surface 16 receiving the impact force. In effect, the column spacer 32 helps to further absorb energy from the impact force before the energy enters the upright 14. The waffle-shaped pattern also reduces the stiffness of the back wall 20 of the inner surface 18. There are also a series of miniature interconnectors 35 crossing the gaps at various locations; these interconnectors ensure the column spacer 32 returns to its appropriate shape after the protector 10 receives an impact.

The column spacer 32 remains detached from the shim 28, further facilitating both friction and hysteretic damping between the shim 28, the column spacer 32, and the column spacer 32. Friction damping occurs when portions of the shim 28 rub against the protector body 12. Any residual energy from the impact force passing beyond the shim 28 should sufficiently be absorbed from such damping effects, further ensuring the energy from the impact force will not create damage to the upright 14. It will be understood that in certain circumstances adhesives or other joining mechanisms may be used to join the column spacer 32 to the shim 28, when desired.

The protector 10 has a plurality of series of shallow contours 34 spanning the outer surface 16 of the protector 10. These contours 34 facilitate the substantial and resilient deformation of the protector 10 by disturbing the smooth outer surface 16, making it less likely the protector 10 will directly receive an impact at once. The design of these contours 34 is convenient to place a portion of reflective tape, or the like, within each, so the protector 10 becomes more visible to onlookers and makes intentional avoidance of the upright 14 easier.

Figure 16:
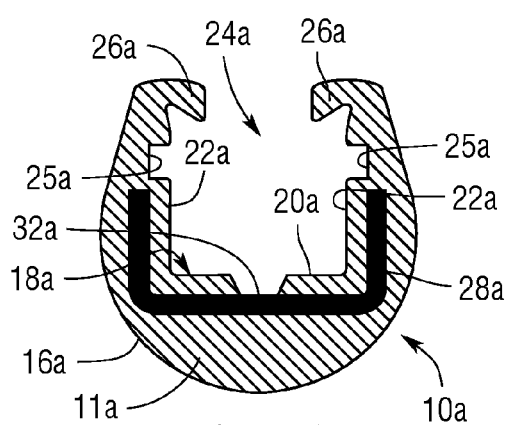
FIG. 16 shows a cross sectional view of another embodiment of the protector.

As shown in FIG. 16, another embodiment of the protector 10a incorporates a shim 28a having a greater thickness than the shim of the embodiment discussed above. The shim 28a is made of rigid material that has a substantially greater stiffness than the stiffness of the elastomeric material constructing the protector body 11a, so as to greatly increase the structural support for the protector body 11a. Here, the shim 28a causes the protector body 11a to be far stiffer than the protector disclosed in other embodiments. Typically the shim 28a is made of a metal material or hard plastic material; however, it will be understood that any rigid material having a substantially greater stiffness than the stiffness of the elastomeric material constructing the protector body 11a can be used.

Figure 17:
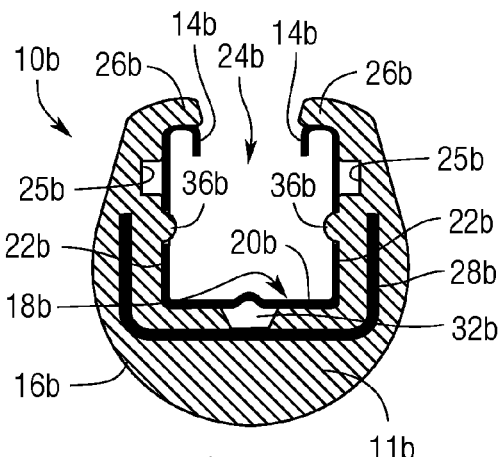
FIG. 17 shows a cross sectional view of another embodiment of the protector.

As shown in FIG. 17, another embodiment of the protector 10b incorporates a series of mounting devices 36b, located on both side walls 22b of the inner surface 18b. These mounting devices 36b ensure the protector 10b remains stationary when the protector 10b is in engagement with the upright 14b. The mounting devices 36b interlock with holes, or the like, located along the upright 14b.

Figure 18:
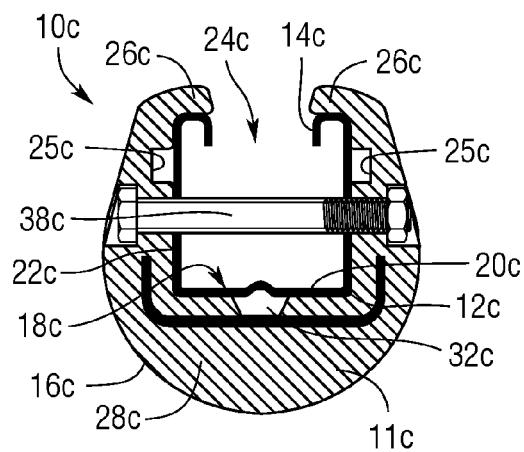
FIG. 18 shows a cross sectional view of another embodiment of the protector.

As shown in FIG. 18, another embodiment of the protector 10c is adapted to incorporate a joining mechanism 38c that runs through the periphery of both the protector 10c and the upright 14c. The joining mechanism 38c permanently mounts the protector 10c to the upright 14c through holes, or the like, aligned on both sides of the upright 14c. The joining mechanism 38c also allows the protector 10c to engage with the upright 14c at some distance above the surface in which the upright 14c is erected. Engaging the protector 10c with the upright some distance above the surface makes it easier for the protector 10c to protect the upright 14c at locations that are more vulnerable to specific types of impacts from the surrounding environment. Furthermore, the joining mechanism 38c is displayed as a nut and bolt combination; however, it is understood that the joining mechanism 38c can be any mechanism able to permanently mount the protector 10c to the upright 14c.

Figure 19:
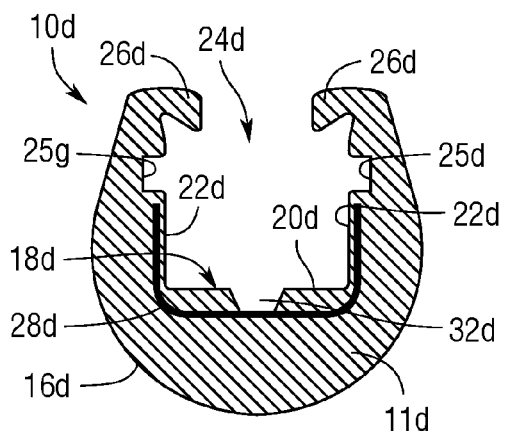
FIG. 19 shows a cross sectional view of another embodiment of the protector.

As shown in FIG. 19, another embodiment of the protector 10d incorporates a shim 28d embedded within the protector body 11d at a position considerably closer to the inner surface 18d than the outer surface 16d. Embedding the shim 28d closer to the inner surface 18d allows the shim 28d to receive and deflect energy from an impact force when it is closer to the inner surface 18d than the outer surface 16d.

Figure 20:
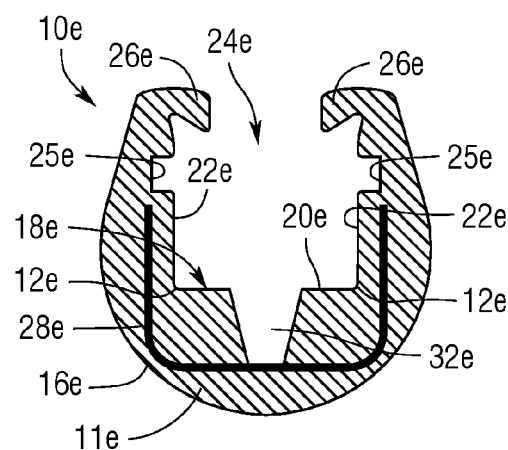
FIG. 20 shows a cross sectional view of another embodiment of the protector.

As shown in FIG. 20, another embodiment of the protector 10e incorporates a shim 28e embedded within the protector body 11e at a position considerably closer to the outer surface 16g than the inner surface 18e. Embedding the shim 28e closer to the outer surface 16e allows the shim 28e to receive and deflect energy from an impact force when it is closer to the outer surface 16e than the inner surface 18e.

Figure 21:
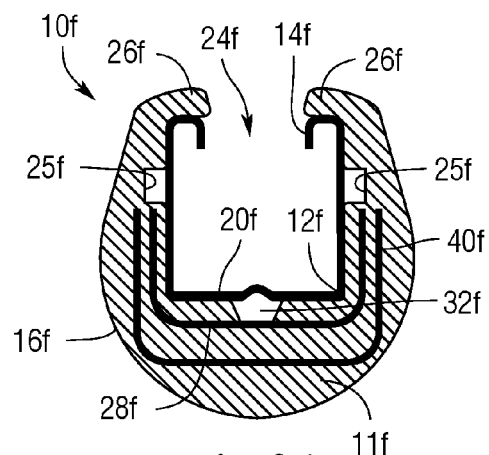
FIG. 21 shows a cross sectional view of the protector of FIG. 1, comprising a plurality of shims.

As shown in FIG. 21, another embodiment of the protector 10f incorporates both a shim 28f and a second shim 40f embedded within the protector body 11f. The shim 28f is positioned closer to the inner surface 18f, and the second shim 40f is positioned closer to the outer surface 16f. Embedding both the shim 28f and second shim 40f within the protector body 11f causes energy from an impact force to be deflected more than once before that energy has an opportunity to travel through to the inner surface 18f. A plurality of deflections make it more probable that minimal energy from an impact force received on the outer surface 16f will travel through to the inner surface 18f and into the upright 14f.

Figure 22:
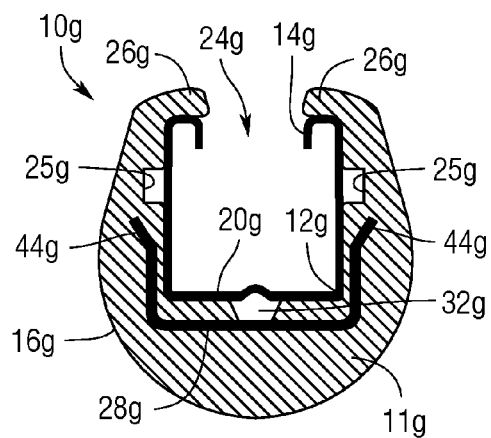
FIG. 22 shows a cross sectional view of the protector of FIG. 1, comprising another embodiment of the shim.

As shown in FIG. 22, another embodiment of the protector 10g incorporates a shim 28g comprising an upset 44g positioned on both of its sides. Each upset 44g helps to secure the shim 28g after being embedded in the protector body 11g, by locking the shim 28g in place. These upsets also alleviate any need for the addition of adhesives, joining mechanisms, or the like, and allowing the shim 28g to remain completely secured while still being detached from the column spacer 32g.

Figure 23:
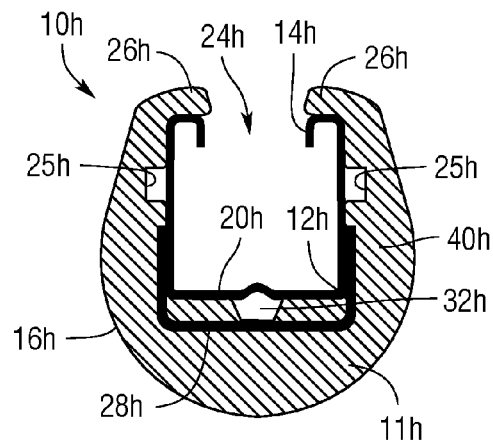
FIG. 23 shows a cross sectional view of the protector of FIG. 1, comprising another embodiment of the shim.

As shown in FIG. 23, another embodiment of the protector 10h incorporates a three-sided shim 28h having a portion of two sides of the shim 28h forming part of the inner surface 18h causing a portion of the shim 28h to abut the upright 14h when the protector 10h is in engagement with the upright 14h. Embodying the shim 28h in this manner keeps it from walking after the protector 10h has received an impact from an external object. This embodiment of the shim 28h also ensures the shim 28h will resist bending after the protector 10h has received an impact from an external object. The shim will also provide an additional amount of rigidity to the elastomeric material which will result in better retention and fit to the column.

Figure 24:
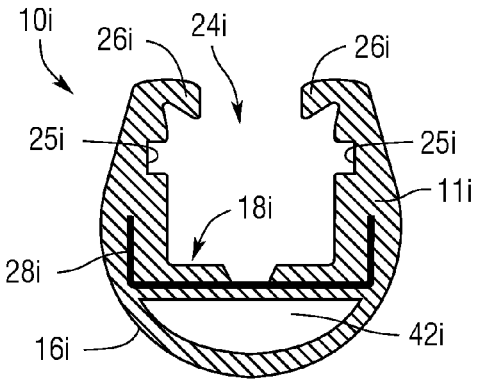
FIG. 24 shows a cross sectional view of another embodiment of the protector, comprising an internal core.
Figure 25:
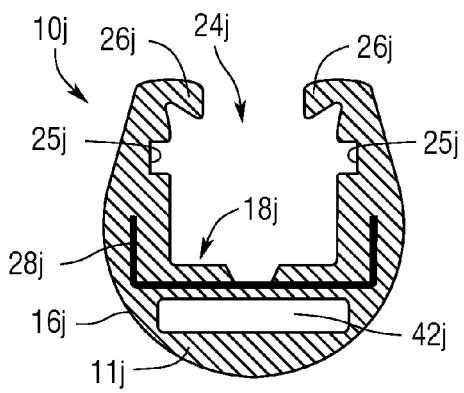
FIG. 25 shows a cross sectional view of another embodiment of the protector of FIG. 24, comprising another embodiment of the internal core.
Figure 26:
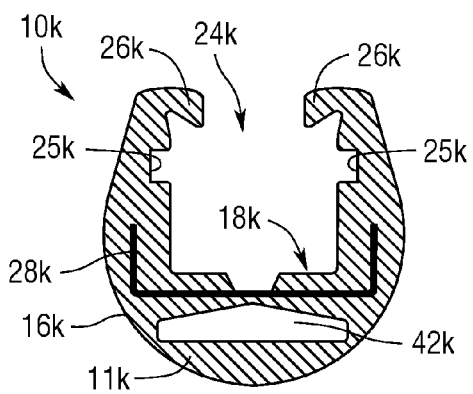
FIG. 26 shows a cross sectional view of another embodiment of the protector of FIG. 24, comprising another embodiment of the internal core.
Figure 27:
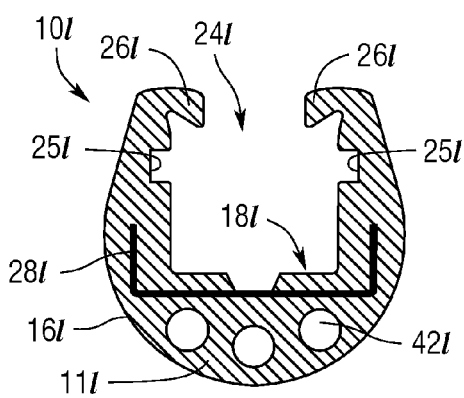
FIG. 27 shows a cross sectional view of another embodiment of the protector of FIG. 24, comprising a plurality of internal cores.
Figure 28:
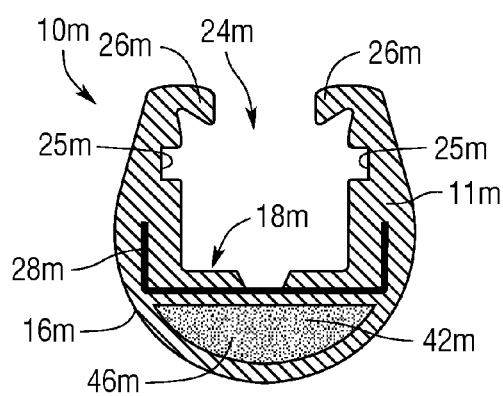
FIG. 28 shows a cross sectional view of the protector of FIG. 24, comprising damping material in the internal core.

As shown in FIG. 24, another embodiment of the protector 10 i has an internal core 42 i centrally located within the protector body 11 i. The internal core 42 i creates a spring-like damping effect within the protector body 11 i after receiving an impact. Upon receiving an impact, the protector body 11 i will compress around the internal core 42 i and decompress immediately thereafter, which further facilitates absorption of the energy from the impact force. The shim 28 i is embedded within the protector body 11 i at a position directly between the outer surface 16 i and the internal core 42 i. As shown in FIG. 25, another embodiment of the protector 10 j has a centrally located internal core 42 j that has a cross section with a rectangular shape. As shown in FIG. 26, another embodiment of the protector 10 k has a centrally located internal core 42 k that has a five-sided pentagonal shape. As shown in FIG. 27, another embodiment of the protector 10 l has a plurality of centrally located internal cores 42 l. In this embodiment, each of the internal cores 42 l creates their own spring-like damping effect within the protector body 11 l. As shown in FIG. 28, another embodiment of the protector 10 m has a centrally located internal core 42 m filled with damping material 46 m. The internal core 42 m creates a spring-like damping effect within the protector body 11 m that further facilitates absorption of the energy from an impact. Upon receiving an impact, the protector body 11 m will compress around the internal core 42 m, the damping material 46 m will then absorb portions of the energy from the impact force just before the internal core 42 m decompresses immediately thereafter.

Figure 29:
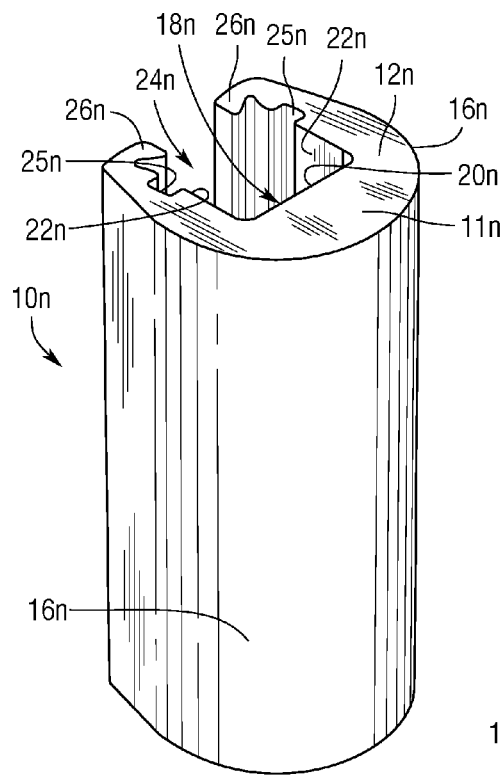
FIG. 29 shows a perspective view of the protector of FIG. 1, comprising a smooth outer surface.
Figure 30:
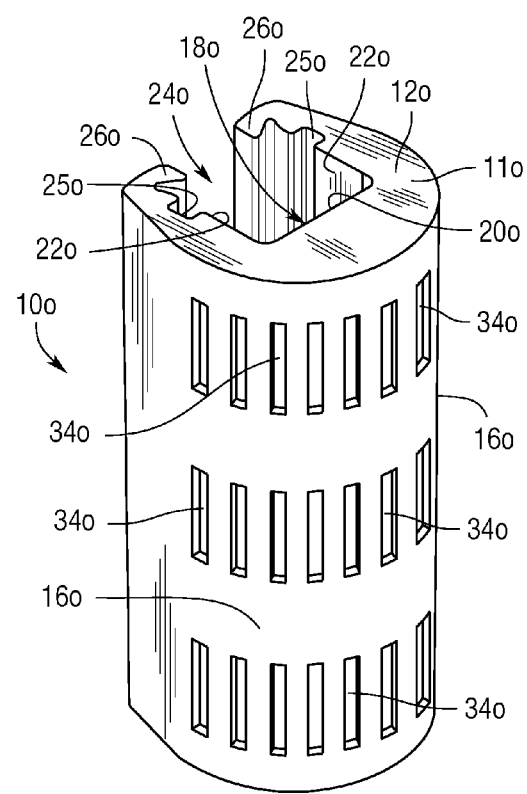
FIG. 30 shows a perspective view of the protector of FIG. 1, comprising another embodiment of the contours on the outer surface.

As shown in FIG. 29, another embodiment of the protector 10n has an outer surface 16n that is smooth and with no impressed contours. As shown in FIG. 30, the protector 10o has an outer surface 16o comprising a plurality of individual series of shallow contours 34o impressed to the outer surface 16o. These contours 34o help facilitate energy absorption within the protector 10o by breaking up surface smoothness of the outer surface 16o such that the protector 10o does not receive an entire impact at once.

Figure 31:
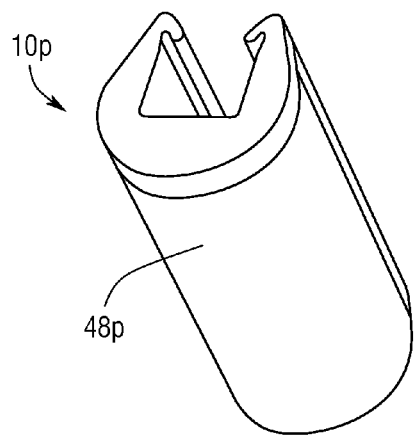
FIG. 31 shows a perspective view of the protector of FIG. 1, incorporating a high-visibility plate.
Figure 32:
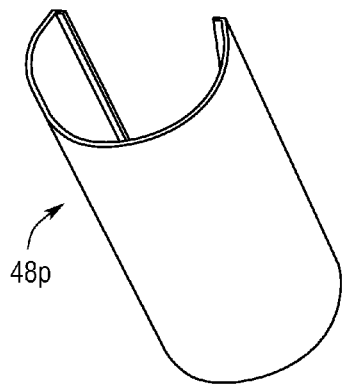
FIG. 32 shows a perspective view of the high-visibility plate of FIG. 31.

As shown in FIGS. 31 and 32, another embodiment of the protector 10p incorporates a high-visibility plate 48p releasably joined to its outer surface 16p. The high-visibility plate 48p is brightly colored and makes the protector 10p more visible to onlookers, making avoidance of the upright is easier when the high-visibility plate 48p releasably joined to the outer surface 16p. Since the high-visibility plate 48p can be made from polymer plastic material, it can also provide additional stiffness and support for the protector body 11p, if needed. The high-visibility plate 48p replaces reflective tape that could be better suited for other embodiments of the protector 10p.

Figure 33:
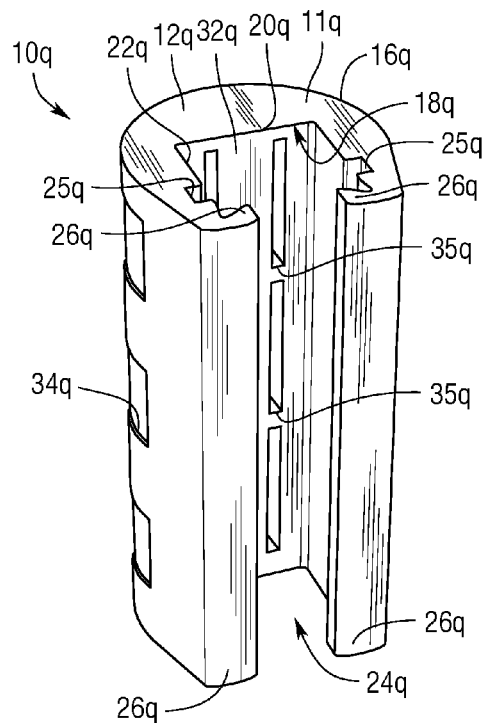
FIG. 33 shows a rear-perspective view of another embodiment of the protector.
Figure 34:
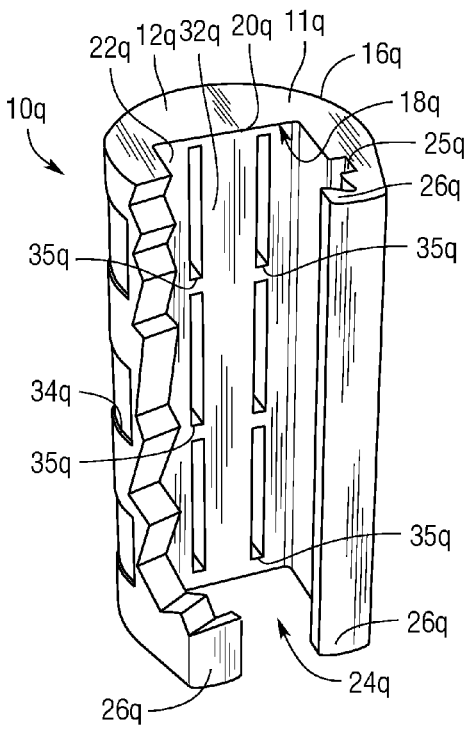
FIG. 34 shows a rear-perspective view of the protector of FIG. 33, exposing the back wall of the protector.

As shown in FIGS. 33 and 34, another embodiment of the protector 10q incorporates an embodiment of the column spacer 32q molded into the unitary structure of body 12q at both the ends, substantially creating the back wall 20q of the inner surface 18q. Gaps in the structure of protector body 11q create the column spacer 32q by running lengthwise on both of its sides. The column spacer 32q is positioned between the shim 28q and the inner surface 18q, but does not actually pass beyond the shim 28q. There are also a series of miniature interconnectors 35q crossing the gaps at various locations; these interconnectors ensure the column spacer 32q returns to its appropriate shape after protector 10q receives an impact.

The column spacer 32q reduces the stiffness of the protector 10q centrally around the upright 14q, allowing for more deformation adjacent to the upright 14q. The column spacer 32q remains detached from the shim 28q, further facilitating both friction and hysteretic damping between the shim 28q, the column spacer 32q, and the column spacer 32q. Friction damping occurs when portions of the shim 28q rub against the protector body 12q. Any residual energy from the impact force passing beyond the shim 28q should sufficiently be absorbed from such damping effects, further ensuring the energy from the impact force will not create damage to the upright 14q. It will be understood that in certain circumstances adhesives or other joining mechanisms may be used to join the column spacer 32q to the shim 28q, when desired.

Figure 35:
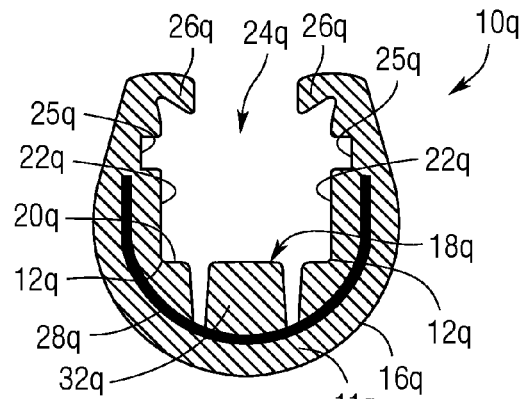
FIG. 35 shows a cross sectional view of the protector of FIG. 33.

As shown in FIG. 35, the shim 28q of this embodiment is considered to be at least partially and approximately equidistant from the outer surface 18q, causing it to have a cross section that is substantially rounded and similar to the rounded shape of the outer surface 18q. Being approximately equidistant from the outer surface 18q ensures protection on the sides of the upright 14q from receiving an impact force. It should be understood that certain portions of the shim 28q will still be considered approximately equidistant even if those portions do not completely follow the shape of the outer surface 18q.

Figure 36:
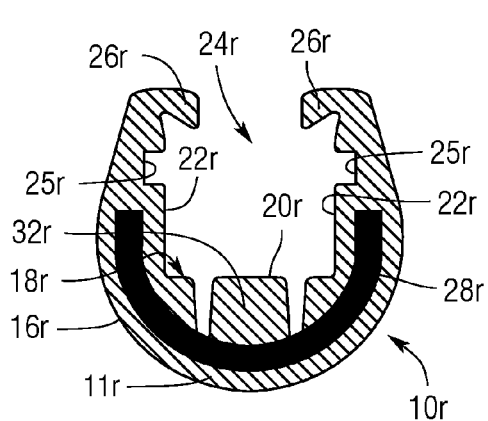
FIG. 36 shows a cross sectional view of the protector of FIG. 33, comprising another embodiment of the shim.

As shown in FIG. 36, another embodiment of the protector 10r incorporates a shim 28r comprising a cross section that is approximately equidistant from the outer surface 16r and having a greater thickness than the shim of the embodiment disclosed in FIGS. 33 through 35, discussed above. The shim 28r is made of rigid material that has a substantially greater stiffness than the stiffness of the elastomeric material constructing the protector body 11r, so as to greatly increase the structural support for the protector body 11r. Here, the shim 28r causes the protector body 11r to be far stiffer than the protector disclosed in other embodiments. Typically the shim 28r is made of a metal material or hard plastic material; however, it will be understood that any rigid material that having a substantially greater stiffness than the stiffness of the elastomeric material constructing the protector body 11r can be appropriately implemented.

The column spacer 32r is molded into the unitary structure of body 12r at both the ends, substantially creating the back wall 20r of the inner surface 18r. Gaps in the structure of protector body 11r create the column spacer 32r by running lengthwise on both of its sides. The column spacer 32r is positioned between the shim 28r and the inner surface 18r, but does not actually pass through the shim 28r.

Figure 37:
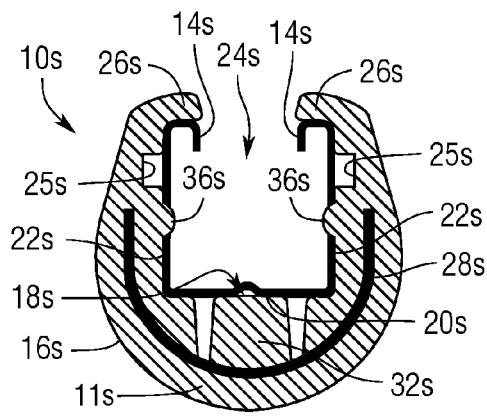
FIG. 37 shows a cross sectional view of another embodiment of the protector.

As shown in FIG. 37, another embodiment of the protector 10s incorporates a series of mounting devices 36s, located on both side walls 22s of the inner surface 18s. These mounting devices 36s ensure the protector 10s remains stationary while in engagement with the upright 14s. The mounting devices 36s interlock with holes, or the like, located along the upright 14s. This embodiment of the protector 10s also incorporates a shim 28s that is approximately equidistant from the outer surface 16s and a column spacer 32s created by running lengthwise on both of its sides, discussed above.

Figure 38:
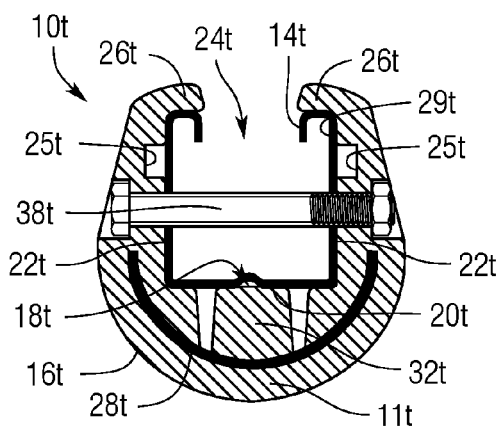
FIG. 38 shows a cross sectional view of another embodiment of the protector.

As shown in FIG. 38, another embodiment of the protector 10t is adapted to incorporate a joining mechanism 38t that runs through the periphery of both the protector 10t and the upright 14t. The joining mechanism 38t permanently mounts the protector 10t to the upright 14t through a hole, or the like, on both sides of the upright 14t, further discussed in a previous embodiment above. This embodiment of the protector 10t also incorporates a shim 28t that is approximately equidistant from the outer surface 16t and a column spacer 32t created by running lengthwise on both of its sides, discussed above.

Figure 39:
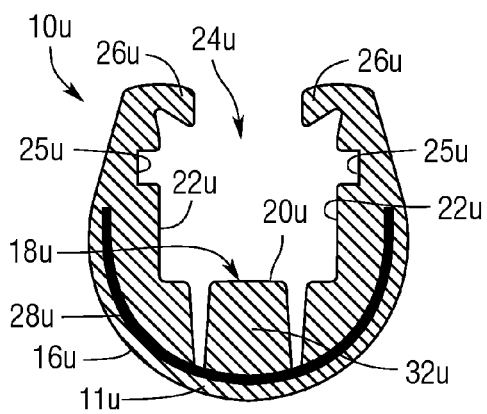
FIG. 39 shows a cross sectional view of another embodiment of the protector.

As shown in FIG. 39, another embodiment of the protector 10u incorporates a shim 28u embedded within the protector body 11u at a position considerably closer to the inner surface 18u than the outer surface 16u. Embedding the shim 28u closer to the inner surface 18u allows the shim 28u to receive and deflect energy from an impact force when it is closer to the inner surface 18u than the outer surface 16u. This embodiment of the protector 10u incorporates a shim 28u having a cross section approximately equidistant from the outer surface 16u and a column spacer 32u that is created by gaps running lengthwise down both of its sides, discussed above.

Figure 40:
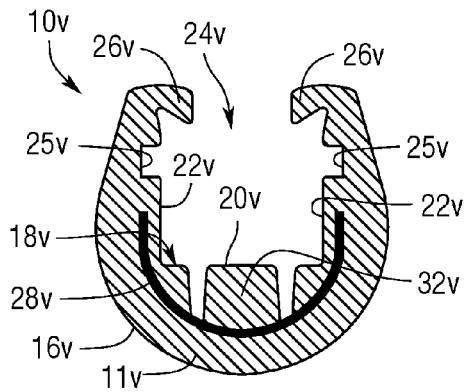
FIG. 40 shows a cross sectional view of another embodiment of the protector.

As shown in FIG. 40, another embodiment of the protector 10v incorporates a shim 28v embedded within the protector body 11v at a position considerably closer to the outer surface 16v than the inner surface 18v. Embedding the shim 28v closer to the outer surface 16v allows the shim 28v to receive and deflect energy from an impact force when it is closer to the outer surface 16v than the inner surface 18v. This embodiment of the protector 10v also incorporates a shim 28v having a cross section approximately equidistant from the outer surface 16v and a column spacer 32v that is created by gaps running lengthwise down both of its sides, discussed above.

Figure 41:
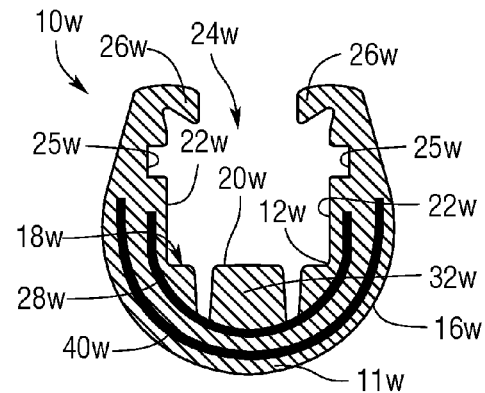
FIG. 41 shows a cross sectional view of the protector of FIG. 33, comprising a plurality of shims.

As shown in FIG. 41, another embodiment of the protector 10w incorporates both a shim 28w and a second shim 40w embedded within the protector body 11w. The shim 28w is positioned closer to the inner surface 18w, and the second shim 40w is positioned closer to the outer surface 16w. Embedding both the shim 28w and second shim 40w within the protector body 11w causes energy from an impact force to be deflected more than once before that energy has an opportunity to travel through to the inner surface 18w. A plurality of deflections make it more likely that minimal energy from an impact force received on the outer surface 16w will travel through to the inner surface 18w and into the upright 14w. In this embodiment of the protector 10w, the shim 28w and second shim 40w both have a cross section approximately equidistant from the outer surface 16w and the column spacer 32w is created by gaps running lengthwise down both of its sides, discussed above.

Figure 42:
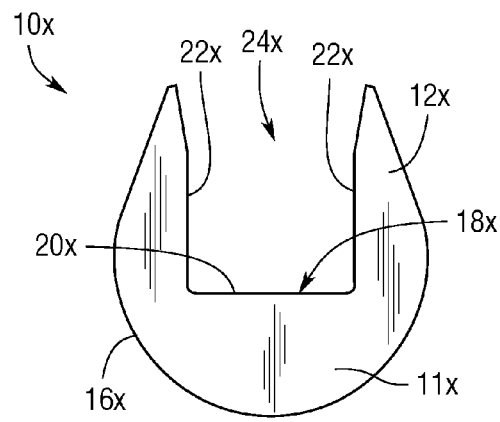
FIG. 42 shows a top view of another embodiment of the protector.
Figure 43:
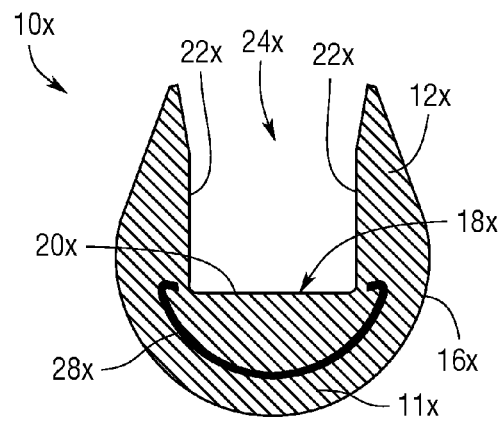
FIG. 43 shows a cross sectional view of the protector of FIG. 42.
Figure 44:
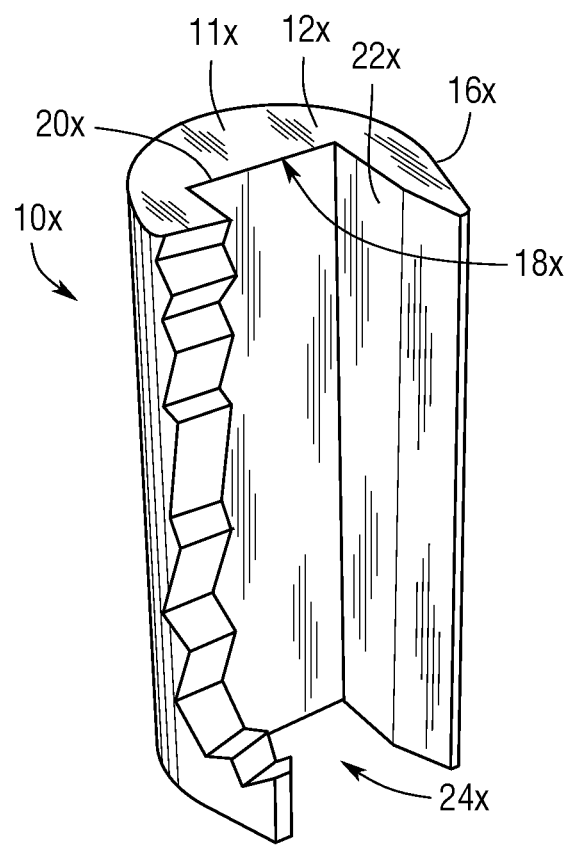
FIG. 44 shows a rear-perspective view of the protector of FIG. 42, exposing the back wall of the protector.

As shown in FIGS. 42 through 44, the protector 10x does not comprise tabs at the entrance to the opening 24x, created by the inner surface 18x on the protector body 11x. Without tabs, the protector 10x can quickly and easily be in engagement and disengagement with the upright, making the protector 10x useful for temporary purposes. The protector body 11x in this embodiment also does not comprise a column spacer, making the protector 10x less equipped to absorb energy from an impact centrally around an upright, which can be advantageous for some applications.

A shim 28x is embedded within the protector body 11x at a position between the outer surface 16x and inner surface 18x. In this embodiment, the shim 28x has a cross section that is rounded into a shape for deflecting frontal impacts received by the outer surface 16x. After a frontal impact has occurred, the shim 28x will partially deflect as well as transfer any remaining energy from the impact force (not shown). Remaining non-deflected energy from the impact force will also further be absorbed through damping caused by the interaction between the shim 28x and the elastomeric material constructing the protector body 11x.

Figure 45:
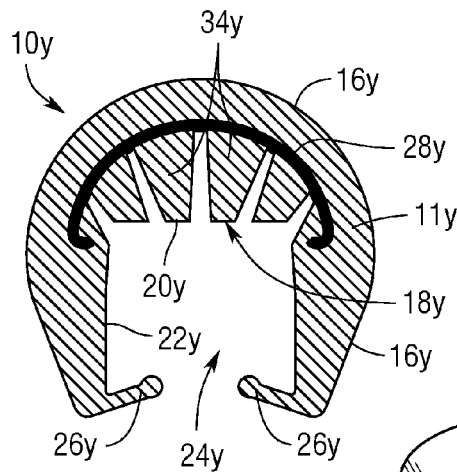
FIG. 45 shows a cross sectional view of another embodiment of the protector.
Figure 46:
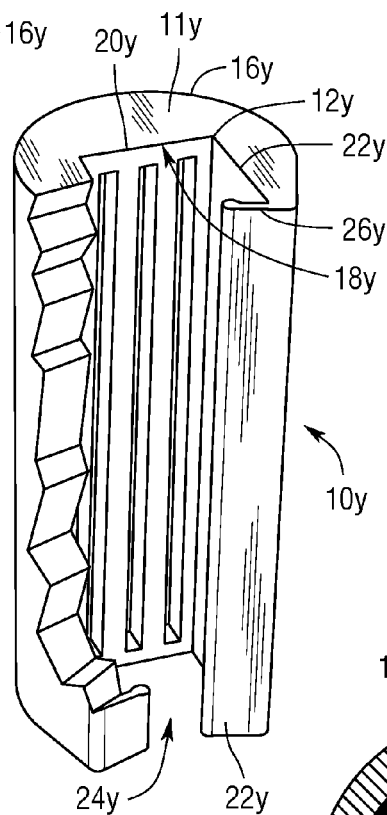
FIG. 46 shows a rear-perspective view of the protector of FIG. 45, exposing the back wall of the protector.

As shown in FIGS. 45 and 46, the protector 10y has a protector body 11y comprising a plurality of centrally positioned column spacers 32y molded to the top and bottom of the protector body fly, forming the back wall 20y of the inner surface 18y. In this embodiment, four column spacers 32y are shown, but it should be understood that more or less column spacers 32y could be incorporated into the protector body 11y. The position of each of these column spacers 32y is between the shim 28y and the inner surface 18y, none of which pass beyond the shim 28y. Gaps in the structure of the protector 12y create each of these column spacers 32y by running lengthwise between each of the column spacers 32y.

Essentially, when an impact force is received by the protector 10y, the column spacers 32y partially buckle and deform before the energy of the impact force travels into the upright 14y. Partial buckling occurs when the column spacers 32y bend and give way upon the outer surface 16y receiving the impact force. In effect, the column spacers 32y help to further absorb energy from the impact force before the impact energy encounters the upright 14y.

These column spacers 32y remain detached from the shim 28y, further facilitating both friction and hysteretic damping between the shim 28y and the column spacers 32y. Any residual impact energy from the impact force passing beyond the shim 28y should sufficiently be absorbed from such damping effects, further ensuring the energy from the impact force will not create damage to the upright 14y. It will be understood that in certain circumstances adhesives or other joining mechanisms may be used to join the column spacers 32y to the shim 28y, when desired.

Figure 47:
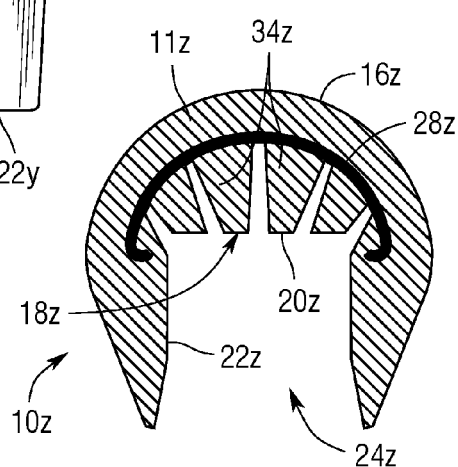
FIG. 47 shows a cross sectional view of another embodiment of the protector.

As shown in FIG. 47, the protector 10z does not comprise tabs at the entrance to the opening 24z, created by the inner surface 18z on the protector body 11z. Without tabs, the protector 10z can quickly and easily be in engagement and disengagement with the upright, making the protector 10z useful for temporary purposes. The protector 10z also comprises a plurality of centrally positioned column spacers 32z molded in conjunction with each other on the top and bottom of the protector body 11y, as discussed in the previous embodiment above.

Figure 48:
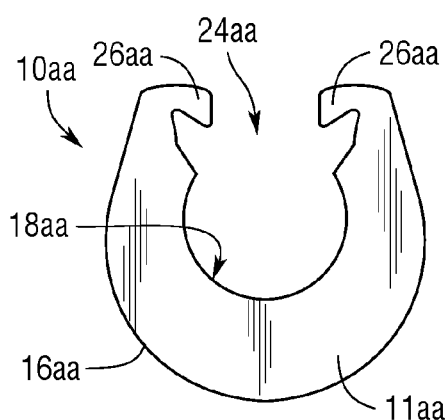
FIG. 48 shows a top view of another embodiment of the protector, which engages with a non-traditional upright.
Figure 49:
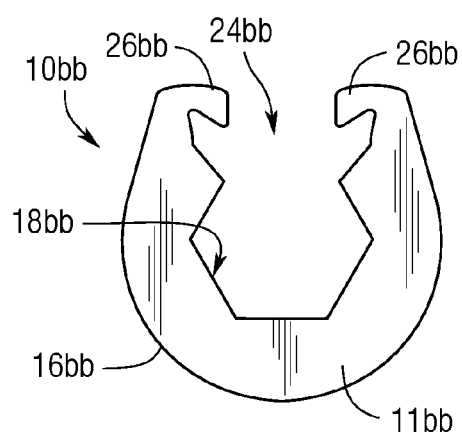
FIG. 49 shows a top view of another embodiment of the protector, which engages with a different embodiment of the non-traditional upright.

As shown in FIG. 48, another embodiment of the protector 10aa comprises an inner surface 18aa with a circular cross section. The inner surface 18aa creates an opening 24aa that facilitates engaging the protector 10aa to a non-traditional upright 14aa that comprises a circular cross section. As shown in FIG. 49, another embodiment of the protector 10bb has an inner surface 18bb with an octagonal cross section. The inner surface 18bb creates an opening 24bb that facilitates engaging the protector 10bb to a non-traditional upright 14bb that comprises an octagonal cross section. It will be understood that the inner surface of an embodiment of the protector may have shapes allowing this surface to facilitate abutting that embodiment of the protector against various non-traditional uprights that comprises cross sections of various widths and shapes.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A protector for engaging and protecting a segment of an upright from an impact force by an external object and for absorbing and damping the resulting impact force traveling through said protector, said protector comprising:
    a protector body, said protector body being at least partially constructed of an energy absorbing and damping material, said protector body comprising an outer surface and an inner surface, said protector body allowing engagement and positioning of said protector on at least a segment of the upright;
    said outer surface of said protector body being positionable to receive the impact force from the external object when positioned on the upright;
    said inner surface of said protector body being positionable to abut the upright when said protector is in engagement with the upright;
    a shim, said shim being at least partially embedded in said protector body, said shim having a stiffness that is different than the stiffness of said protector body, said shim providing increased structural support for said protector body; and
    at least one column spacer molded into said inner surface of said protector body, each said at least one column spacer partially buckling when said outer surface of said protector body has received the impact force from the external object, and each said at least one column spacer does not pass beyond said shim to said outer surface of said protector body.

2. The protector of claim 1 in which each said at least one column spacer comprises a waffle-shaped pattern.

3. The protector of claim 1 wherein said at least one column spacer comprises a plurality of column spacers molded into the inner surface of said protector body, said plurality of column spacers partially buckling when said outer surface of said protector body has received the impact force from the external object.

4. The protector of claim 1 further comprising a plurality of tabs joined to said protector body, said plurality of tabs assists said protector in engagement with the upright.

5. The protector of claim 1 further comprising a second shim partially embedded in said protector body.

6. The protector of claim 1 further comprising a high-visibility plate releasably joinable to said outer surface of said protector body.

7. The protector of claim 1 further comprising a joining mechanism for permanently mounting the protector to the upright.

8. The protector of claim 1 wherein the stiffness of said shim is greater than the stiffness of said protector body.

9. The protector of claim 1 wherein said energy absorbing and damping material is at least partially elastomeric material.

10. The protector of claim 1 wherein said protector body has a continuous volume of energy absorbing and damping material between said inner surface and said outer surface.

11. The protector of claim 1 wherein said outer surface of said protector body comprising a plurality of contours.

12. The protector of claim 1 wherein said shim is constructed of rigid material.

13. The protector of claim 1 wherein said shim is constructed of either metallic material or plastic material.

14. The protector of claim 1 wherein said shim is approximately equidistant from said outer surface of said protector body.

15. The protector of claim 1 wherein said shim is approximately equidistant from said inner surface of said protector body.

16. The protector of claim 1 wherein said shim comprising an upset at least partially securing said shim in said protector body.

17. The protector of claim 1 in which said shim has a series of holes in a dual row pattern.

18. The protector of claim 1 wherein said protector body comprising an internal core.

19. The protector of claim 1 wherein:
    said protector body comprising an internal core; and
    said internal core is filled with damping material.

20. The protector of claim 1 wherein the damping of the impact force in said protector body is caused by friction between said shim and said protector body.

21. The protector of claim 1 wherein the damping of the impact force in said protector body is caused through hysteresis.

22. The protector of claim 1 wherein said shim partially deflecting the impact force from reaching said inner surface of said protector body.

23. The protector of claim 1 wherein said protector is partially fabricated through an injection molding process or extrusion process.

24. The protector of claim 1 wherein said inner surface of said protector body comprising a series of mounting devices assisting said protector in engaging with the upright.

25. The protector of claim 1 wherein said inner surface of said protector body creates an opening that has a cross-section that is substantially one of square, circular, or octagonal.

26. A protector for engaging and protecting a segment of an upright from an impact force by an external object and for absorbing and damping the resulting impact force traveling through said protector, said protector comprising:
    a protector body, said protector body being at least partially constructed of an energy absorbing and damping material, said protector body comprising an outer surface and an inner surface, said protector body allowing engagement and positioning of said protector on at least a segment of the upright;
    said outer surface of said protector body being positionable to receive the impact force from the external object when positioned on the upright;
    said inner surface of said protector body being positionable to abut the upright when said protector is in engagement with the upright;
    a shim, said shim being at least partially embedded in said protector body, said shim having a stiffness that is different than the stiffness of said protector body, said shim providing increased structural support for said protector body; and
    a column spacer molded into said inner surface of said protector body, said column spacer does not pass beyond said shim to said outer surface of said protector body, and said column spacer partially buckling when said outer surface has received the impact force.

27. The protector of claim 26 further comprising a plurality of tabs joined to said protector body, said plurality of tabs assists said protector in engagement with the upright.

28. The protector of claim 26 further comprising a second shim partially embedded in said protector body.

29. The protector of claim 26 further comprising a high-visibility plate releasably joinable to said outer surface of said protector body.

30. The protector of claim 26 further comprising a joining mechanism for permanently mounting the protector to the upright.

31. The protector of claim 26 wherein the stiffness of said shim is greater than the stiffness of said protector body.

32. The protector of claim 26 in which said column spacer comprises a waffle-shaped pattern.

33. The protector of claim 26 wherein said outer surface of said protector body comprising a plurality of contours.

34. The protector of claim 26 wherein said energy absorbing and damping material is at least partially elastomeric material.

35. The protector of claim 26 wherein said protector body has a continuous volume of energy absorbing and damping material between said inner surface and said outer surface.

36. The protector of claim 26 wherein said shim is constructed of rigid material.

37. The protector of claim 26 wherein said shim is constructed of either metallic material or plastic material.

38. The protector of claim 26 wherein said shim is approximately equidistant from said outer surface of said protector body.

39. The protector of claim 26 wherein said shim is approximately equidistant from said inner surface of said protector body.

40. The protector of claim 26 wherein said shim comprising an upset at least partially securing said shim in said protector.

41. The protector of claim 26 in which said shim has a series of holes in a dual row pattern.

42. The protector of claim 26 wherein said protector body comprising an internal core.

43. The protector of claim 26 wherein:
said protector comprising an internal core; and
said internal core is filled with damping material.

44. The protector of claim 26 wherein the damping of the impact force in said protector body is caused by friction between said shim and said protector body.

45. The protector of claim 26 wherein the damping of the impact force in said protector is caused through hysteresis.

46. The protector of claim 26 wherein said shim partially deflecting the impact force from reaching said inner surface of said protector body.

47. The protector of claim 26 wherein said protector is partially fabricated through an injection molding process or extrusion process.

48. The protector of claim 26 wherein said inner surface of said protector body comprising a series of mounting devices assisting said protector in engaging with the upright.

49. The protector of claim 26 said inner surface of said protector body creates an opening that has a cross-section that is substantially one of square, circular, or octagonal.

50. A protector for engaging and protecting a segment of an upright from an impact force by an external object and for absorbing and damping the resulting impact force traveling through said protector, said protector comprising:
a protector body, said protector body being at least partially constructed of an energy absorbing and damping material that substantially and resiliently deforms when receiving the impact force from the external object, said protector body comprising an outer surface and an inner surface, said protector body allowing engagement and positioning of said protector on at least a segment of the upright;
said outer surface of said protector body being positionable to receive the impact force from the external object when positioned on the upright;
said inner surface of said protector body being positionable to abut the upright when said protector is in engagement with the upright;
a shim, said shim being at least partially embedded in said protector body, said shim being made of a rigid material and having a stiffness that is different than the stiffness of said protector body, said shim providing increased structural support for said protector body; said shim at least partially deflecting the impact force while traveling through said protector body; and
at least one column spacer molded into said inner surface of said protector body, each said at least one column spacer does not pass beyond said shim to said outer surface of said protector body.

51. The protector of claim 50 in which each said at least one column spacer comprises a waffle-shaped pattern.

52. The protector of claim 50 wherein said at least one column spacer comprises a plurality of column spacers molded into the inner surface of said protector body, said plurality of column spacers partially buckling when said outer surface of said protector body has received the impact force.

53. The protector of claim 50 further comprising a plurality of tabs joined to said protector body, said plurality of tabs assists said protector in engagement with the upright.

54. The protector of claim 50 further comprising a second shim partially embedded in said protector body.

55. The protector of claim 50 further comprising a high-visibility plate releasably joinable to said outer surface of said protector body.

56. The protector of claim 50 further comprising a joining mechanism for permanently mounting said protector to the upright.

57. The protector of claim 50 wherein the stiffness of said shim is greater than the stiffness of said protector body.

58. The protector of claim 50 wherein said outer surface of said protector body comprising a plurality of contours.

59. The protector of claim 50 wherein said energy absorbing and damping material is at least partially elastomeric material.

60. The protector of claim 50 wherein said protector body has a continuous volume of energy absorbing and damping material between said inner surface and said outer surface.

61. The protector of claim 50 wherein said shim is constructed of either metallic material or plastic material.

62. The protector of claim 50 wherein said shim is approximately equidistant from said outer surface of said protector body.

63. The protector of claim 50 wherein said shim is approximately equidistant from said inner surface of said protector body.

64. The protector of claim 50 wherein said shim comprising an upset at least partially securing said shim in said protector body.

65. The protector of claim 50 in which said shim has a series of holes in a dual row pattern.

66. The protector of claim 50 wherein said protector comprising an internal core.

67. The protector of claim 50 wherein:
said protector comprising an internal core; and
said internal core is filled with damping material.

68. The protector of claim 50 wherein the damping of the impact force in said protector body is caused by friction between said shim and said protector body.

69. The protector of claim 50 wherein said damping of the impact force in said protector body is caused through hysteresis.

70. The protector of claim 50 wherein said shim partially deflecting the impact force from reaching said inner surface of said protector body.

71. The protector of claim 50 wherein said protector is partially fabricated through an injection molding process or extrusion process.

72. The protector of claim 50 wherein said inner surface of said protector body comprising a series of mounting devices assisting said protector in engaging with the upright.

73. The protector of claim 50 wherein said inner surface of said protector body creates an opening that has a cross-section that is substantially one of square, circular, or octagonal.

74. A protector for engaging and protecting a segment of an upright from an impact force by an external object and for absorbing and damping the resulting impact force traveling through said protector, said protector comprising:

a protector body, said protector body being at least partially constructed of an elastomeric material that substantially and resiliently deforms when receiving the impact force from the external object, said protector body comprising an outer surface and an inner surface, said protector body allowing engagement and positioning of said protector on at least a segment of the upright;

said outer surface of said protector body being positionable to receive the impact force from the external object when positioned on the upright;

said inner surface of said protector body being positionable to abut the upright when said protector is in engagement with the upright, said inner surface creating an opening with a substantially square-shaped cross section and plurality of corners;

a shim, said shim being at least partially embedded in said protector body, said shim being made of a rigid material and having a stiffness that is greater than the stiffness of said protector body, said shim providing increased structural support for said protector body, said shim is approximately equidistant from said opening of said inner surface of said protector body, said shim at least partially deflecting the impact force while traveling through said protector body and transferring the remaining impact force to each of said corners of said opening;

a column spacer molded into one side of said inner surface, said column spacer does not pass beyond said shim to said outer surface, said column spacer is detached from said shim, said column spacer comprising a waffle-shaped pattern, said column spacer partially buckling when said outer surface receives the impact force; and a plurality of tabs joined to said protector body, said plurality of tabs assists said protector in engagement with the upright.

75. The protector of claim 74 further comprising a second shim partially embedded in said protector body.

76. The protector of claim 74 further comprising a high-visibility plate releasably joinable to said outer surface of said protector body.

77. The protector of claim 74 further comprising a joining mechanism for permanently mounting the protector to the upright.

78. The protector of claim 74 wherein said outer surface of said protector body comprising a plurality of contours.

79. The protector of claim 74 wherein said protector body has a continuous volume of elastomeric material between said inner surface and said outer surface.

80. The protector of claim 74 wherein said shim is constructed of either metallic material or plastic material.

81. The protector of claim 74 wherein said shim comprising an upset at least partially securing said shim embedded in said protector body.

82. The protector of claim 74 in which said shim has a series of holes in a dual row pattern.

83. The protector of claim 74 wherein said protector comprising an internal core.

84. The protector of claim 74 wherein:
said protector comprising an internal core; and
said internal core is filled with damping material.

85. The protector of claim 74 said protector is partially fabricated through an injection molding process or extrusion process.

86. The protector of claim 74 wherein said inner surface of said protector body comprising a series of mounting devices assisting said protector in engaging with the upright.

87. The protector of claim 74 wherein the damping of the impact force in said protector body is caused by friction between said shim and said protector body.

88. The protector of claim 74 wherein said damping of the impact force in said protector body is caused through hysteresis.

* * * * *